United States Patent

[11] 3,593,268

| [72] | Inventor | John A. Arvan<br>9 South Main St, Port Chester, N.Y. 10573 |
|---|---|---|
| [21] | Appl. No. | 760,257 |
| [22] | Filed | Sept. 17, 1968 |
| [45] | Patented | July 13, 1971 |

[54] AUTOMATIC PRESSURE WARNING DEVICE FOR PNEUMATIC UNITS
4 Claims, 5 Drawing Figs.

[52] U.S. Cl. .................................................. 340/58,
200/61.25
[51] Int. Cl. ................................................. B60c 23/00
[50] Field of Search ........................................... 340/58;
200/61.22, 61.25, 82

[56] References Cited
UNITED STATES PATENTS

| 2,524,968 | 10/1950 | Ericksen et al. | 340/58 |
| 3,296,590 | 1/1967 | Dalton | 340/58 |
| 3,488,464 | 1/1970 | Hocking | 200/82 |

Primary Examiner—John W. Caldwell
Assistant Examiner—Howard S. Cohen
Attorney—Irving Seidman ABSTRACT: An improved automatic warning device for tires to identify pressures outside of predetermined ranges. The device is secured to a standard valve stem. An opening in a plug allows the interior tire pressure to bear against a spring biased plunger. The biasing force of the spring is varied by adjustment of a screw member. The plunger rod bears against a spring biased conductor and in the normal state, the rod maintains the conductor out of electrical contact. If the pressure falls below a certain level the plunger rod withdraws away from the conductor, and the conductor is moved by its biasing means into electrical contact. If the pressure rises above a certain level, the plunger rod bears more strongly against the conductor, and the conductor is moved against its biasing means in the opposite direction and into electrical contact.

PATENTED JUL 13 1971　　3,593,268

INVENTOR.
John A. Arvan
BY
ATTORNEY

AUTOMATIC PRESSURE WARNING DEVICE FOR PNEUMATIC UNITS

This invention relates to automatic warning devices for pneumatic units, and more particularly to an automatic warning device for tires to inform the occupants when the time pressure goes below or above certain predetermined ranges.

The concept behind such devices is well known in the prior art but nothing practical has been developed to date. The reasons appear to be the complexity of the units, as well as their lack of flexibility for use under a range of conditions.

Accordingly, it is among the principal objects of the present invention to provide a tire pressure warning device which is very simple to construct and maintain.

Yet another object of the present invention is to provide a pressure warning device of the character described which may be readily and simply adjusted to provide for a multiplicity of ranges within which a single device may operate, greatly increasing the utility of the invention.

Another object of the present invention is to develop a device of the character described which will be inexpensive to manufacture and will be durable to a high degree in use.

The present invention contemplates a pneumatic pressure warning device, particularly for use with automobile tires which may be secured directly to the tire valves, and has a bore in a plug communicating directly with the interior pressure of the time so tat the pressure may bear against the mechanism in the interior of the housing of the device. The pressure bears against a plunger means which is spring biased toward the bore opening by means of a screw member which is readily adjustable within the housing to vary the force within the spring. The plunger means has a rod extending to the screw member and which is received within a cup assembly housing and bears against a conducting cup which is also spring biased towards the interior tire pressure source. The conducting cup may make contact in its fully extended position or in its fully compressed condition.

Under ordinary operating conditions, the plunger rod is moved away from the bore in the plug by the pressure in the tire, and maintains the conducting cup in a median position between the two contacts. Should the pressure within the tire fall below a predetermined level, the force of the air becomes less than the force within the spring, causing the plunger rod to be moved away from the conducting cup, and allowing the conducting cup to be extended completely until it completes electrical contact, causing a light which may be located upon the dashboard of the automobile to denote this low pressure. In a like manner, if the pressure in the tire becomes too great, the force of the pressure becomes significantly greater than the force within the spring causing the plunger rod to bear more strongly against the conducting cup, completely compressing it and forcing it into electrical contact, once again completing the electrical circuit and causing the warning light within the automobile to signal.

The above description and objects of the present invention will become apparent from a reading of the following description, taken with reference to the accompanying drawings, wherein.

Figure 1:
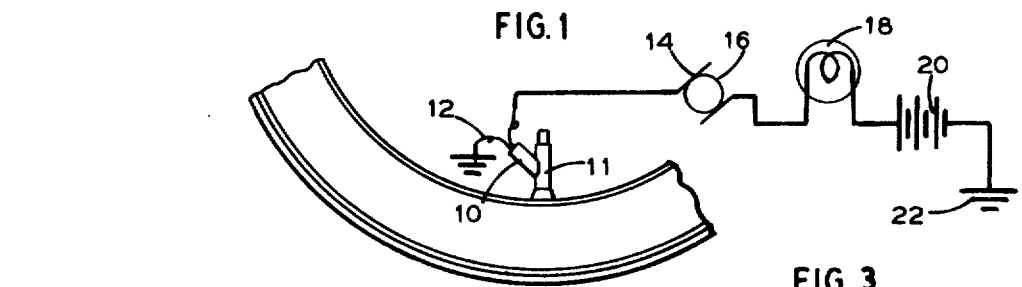
FIG. 1 is a fragmentary, partial schematic view showing the electrical circuitry of the present invention.

Turning to the drawings, and in particular to FIG. 1, there is shown a device 10 attached to a valve stem 11. The device has two electrical conduits secured to it, one line 12 leading to ground, and the other one being secured to a contact brush 14 which engages a slip ring 16 in the usual manner. The slip ring may be secured to the tire axle and to a lamp 18 which may be positioned on the dashboard of the automobile, or the control panel of a pneumatic device which may be monitored. The lamp is further connected to a power source 20 and thence to the ground 22. It should be understood that this electrical circuit is simply by means of explanation and any number of well-known circuits may be utilized in its place to insure proper operation of the invention.

Figure 2:
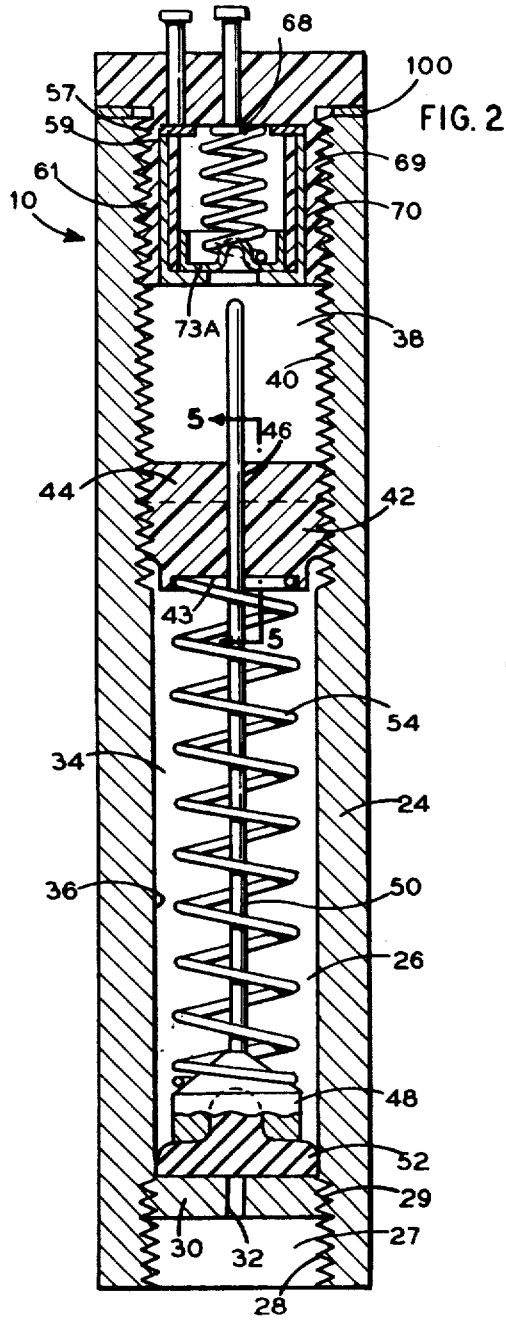
FIG. 2 is an enlarged cross-sectional view, partially cut away from showing the device when the signal pressure has fallen below a predetermined level.

Turning to FIG. 2 there is shown the details of the invention. The device consists of a housing 24 in which is defined a bore 26. The housing is divided into three basic sections.

A first section 27 has threads 28 extending for a short distance into the interior of the housing and terminating at a shoulder 29. The threads serve two purposes. The first purpose is to allow the device 10 to be secured at its lower end to the valve stem 11, and the second purpose is to allow the placement of a plug 30 having a corresponding external mating thread to be screwed in position abutting against the shoulder 29. The plug 30 has a bore 32 through which the pneumatic pressure from the tire may communicate with the interior of the device 10. For the purposes of description, the first section 27 of the device 10 will be referred to as the lower end of the housing.

A second section 34 of the housing 24 has an smooth inner surface 36 and extends substantially half the length of the housing. A third section 38 has internal treads 40 and extends the rest of the length of the housing to the upper end thereof.

Positioned within the third section is a screw member 42 having external threads mating with the internal treads 40. The member has a seat 43 for the purpose hereinafter appearing and a stem portion 44. This stem portion may be easily engaged for rotational movement within the housing to allow adjustment of the screw member for varying of its axial position. The member 42 also has an axial bore 46 defined therein.

Also positioned within the housing and extending to the second section 34 and a substantial portion of the third section 38 is a plunger 48 having a plunger rod 50 extending actually up into the housing, the rod 50 extends upwardly through the bore 46. Coiled around the rod and retained between the plunger 48 and the seat 43 is a compression spring 54. A suction cup 52 is secured to the lower end of the plunger and has an added circumference approximately equal to the inner circumference of the wall 36, forming a basically airtight fit. Thus a signal pressure entering into the housing in through the bore 32 will exert a force against the cup much in the manner of a standard piston chamber. If this force is greater than the residual force within the spring 54, the assembly of the suction cup and plunger will be moved upwardly within the housing.

Located at the top of the third section 38 and closing off the housing is a closure cap assembly 56. The assembly includes a head portion 58 having a bore 60 through which passes a contact screw 62, as well as a bore 64 through which passes a contact screw 66 having a somewhat extended head 68 in the interior. Extending downwardly from the head portion is a cylindrical wall 57 having an inner surface 59 and an external thread 61 which mate with threads 40.

Telescoped within the downwardly extending cylindrical wall 69 of the head portion is the inner subassembly 70 which contains a compression spring 71 maintained between the head 68 of the contact screw 66 and a conducting cup 72. The cup may be cylindrical in configuration with a detent 73 located in its end wall 73A for the purpose hereinafter appearing.

A conducting washer is placed against the base of the head portion 58 and abuts the inner surface 59 of the cylindrical wall 57 of the head portion, but does not touch either the head 68 of the contact 66 or the spring 71. The washer is defined by a surface 75 and inner edge 76 spaced from the head 68 and a surface 77. An insulating sleeve 78, having an inner edge 79 abutting the surface 77 of the washer 74 and an inner edge 80, is then placed in position. This sleeve is spaced from the cylindrical wall of the head portion and has an outer surface 82 and an inner surface 84. A steel conducting sleeve 86 is telescoped over the insulating sleeve and completely fills the space between the sleeve and the cylindrical wall and has an edge 88 which abuts the surface 75 of the washer 74, an inner surface 90, an outer surface 92, which abuts the outer surface 82 of the insulating sleeve and the inner surface of the cylindrical wall, and an inwardly extending annular shoulder 94 defined by an inner surface 96 and an inner edge 98. An O-ring seal 100 may be positioned between the housing and the head portion to insure a proper tight fit. Thus, it can be seen that the subassembly is very simple to manufacture, may be assembled very rapidly and the secured to the housing pin. At the same time it may be rapidly disengaged to allow axial adjustment of the screw member 42.

Figure 3:
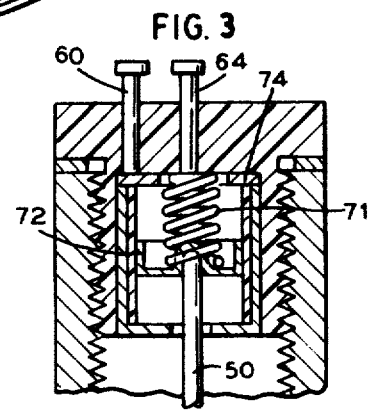
FIG. 3 is a view similar to FIG. 2, but showing the device in its normal operating position within a predetermined range.

The operation of the device is equally as simple. The device is secured to a valve stem or any outlet of pneumatic device and at the same time secured to an electrical signal circuit. When the conducting cup 72 is either fully extended by the force within the spring 71, or fully compressed, there will be a completed circuit passing from the head 68 trough the cup and either via the shoulder 94 or the washer 74 to the outer screw 62. FIG. 3 shows the device in normal operating condition. The interior pressure in the tire is sufficient to overcome the force within the spring and to cause the rod to move upwardly in the housing. The rod is received within the detent 73 and pushes the cup 72 away from contact with the shoulder 94 to a median position between the shoulder and the washer.

Should the pressure within the tire fall below the desired pressure range, the condition as illustrated in FIG. 2 occurs, namely the force of the spring becomes greater than the tire signal causing the plunger to move away from the detent and allowing it to once again contact the annular shoulder of the conducting sleeve. This will cause a completion of the circuit and cause the lamp 18 to light.

Figure 4:
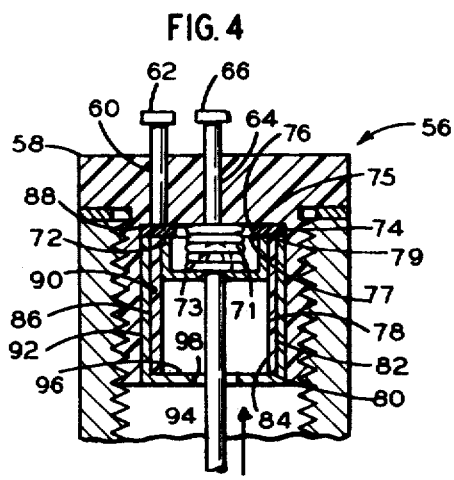
FIG. 4 is a view similar to FIG. 2 but showing the device when the signal pressure has gone above a predetermined level.
Figure 5:
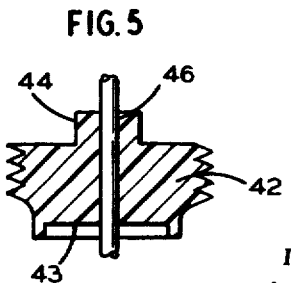
FIG. 5 is a cross-sectional view of the adjustable screw member, taken along the lines 5-5 of FIG. 2.

In a like manner (FIG. 4) should the pressure become greater than that desired, the plunger rod will extend further upwardly in the housing causing the conducting cup to be pressed against the washer 74. This completes contact between the washer and the conducting sleeve through the screws 62, 66 once again closing the electrical circuit and causing the lamp to light.

A decided advantage of the present invention over the prior art is the simplicity of adjustment for the desired range of pressures. All that is necessary is that the enclosure cap assembly 56 be unscrewed and removed from the top of the housing and the screw member may be rotated either clockwise or counterclockwise, changing the actual position of the screw member within the housing. This will vary the residual force within the spring 54, requiring a greater or lesser pressure, as the case may be, from the signal source to cause movement of the plunger. The spring 54, as well as spring 71, acts in the manner of lock washers, preventing movement of screw member 42 and head portion 58 from moving. This greatly increases the accuracy of the invention since desired ranges can be maintained during operation. Maintenance is also significantly reduced since dirt is prevented from entering the interior of the device.

It should be noted tat the electrical circuitry may be changed to have separate lamps in place of the single lamp 18; one lamp for pressures below the lower limit and one lamp for pressures above the upper limit.

The terms and expressions which have been employed here are used as terms of description and not of limitation, and there is no intention, in the use of such terms and expressions, of excluding equivalence of the features shown and described, or portions thereof, it being recognized that various modificatons are possible within the scope of the invention claimed.

I claim:

1. An improved automatic warning device for pneumatic units to identify pressures outside of a predetermined range comprising:
    a. a housing secured to an outlet from the pneumatic unit providing the device from a signal at all times equivalent with the pressure within the unit;
    b. plunger means within the housing responsive to the pressure within the pneumatic unit, the plunger means having a rod;
    c. compression spring means urging said plunger toward the outlet;
    d. adjustment means within the housing to vary the forces within the spring, said means being adjustably spaced from the plunger means and locating the compression spring therebetween; and
    e. a closure cap assembly detachably secured to the housing;
    f. contact means within the cap assembly, said means including a conducting cup and a second compression spring urging said cup toward the outlet, said cup being movable from a first contact position to a second contact position, the rod of the plunger means engaging the cup to move said cup from the first contact position to a median position without contact, and to the second contact position, depending on the pressure within the pneumatic unit.

2. The invention according to claim 1, wherein the conducting cup has a detent sized to receive the rod of the plunger means.

3. The invention according to claim 1, further including an insulating sleeve surrounding said cup and second spring, a second conducting cup telescoping over said sleeve and having a shoulder portion forming the first contact position, and a conducting washer abutting said second conducting cup and spaced from the shoulder portion thereof forming the second contact position.

4. The invention according to claim 1, wherein said adjustment means comprises a screw member having a seat in one end to receive the compression spring and a stem portion at the other end thereof, said screw member being located intermediate the plunger means and the closure cap assembly and having a through-opening therein, the rod of said plunger means passing through said opening.